United States Patent [19]

Breton et al.

[11] Patent Number: 5,290,322
[45] Date of Patent: Mar. 1, 1994

[54] PROCESS FOR THE CRYSTALLIZATION OF SODIUM BICARBONATE

[75] Inventors: Claude Breton; Léon Ninane, both of Dombasle-sur-Meurthe, France

[73] Assignee: Solvay & Cie (Société Anonyme), Brussels, Belgium

[21] Appl. No.: 522,605

[22] Filed: Apr. 24, 1990

[30] Foreign Application Priority Data

Apr. 24, 1989 [FR] France .................. 89 05513

[51] Int. Cl.$^5$ ............................ C01D 7/24
[52] U.S. Cl. ................... 23/302 T; 423/422; 23/313 FB
[58] Field of Search .......... 23/302 T, 313 FB; 423/189, 184, 422

[56] References Cited

U.S. PATENT DOCUMENTS

| | | | |
|---|---|---|---|
| 1,922,283 | 8/1933 | Dering | 23/302 T |
| 2,193,817 | 3/1940 | Houghton et al. | 423/192 |
| 2,294,778 | 9/1972 | Haghton | 23/302 T |
| 3,855,397 | 12/1974 | Hoffman | 23/302 T |
| 3,855,398 | 12/1974 | Hoffman et al. | 423/422 |
| 4,605,771 | 8/1986 | Ninane et al. | 564/497 |

FOREIGN PATENT DOCUMENTS

| | | |
|---|---|---|
| 2551428 | 11/1985 | France . |
| 2634665 | 2/1990 | France . |
| 57-92517 | 6/1982 | Japan ............ 23/302 T |

OTHER PUBLICATIONS

Chemical Engineer's Handbook, J. H. Perry, ed. McGraw-Hill 1950 (no month) pp. 1064–1068.
Agarwal et al. *Ind. Eng. Chem. Fundam.* (19), 1980 pp. 59–66 (no month).
*Chemical Engineers' Handbook* 4th Ed. (1963) pp. 20.43–20.46 (no month).
*Condensed Chemical Dictionary* 9th Ed. pp. 782 and 785 (no date).
Te-Pang Hou "Manufacture of Soda"; 2nd edition, American Chemical Society Monograph Series; 1969; pp. 132–157.
Shreve "The Chemical Process Industries" 2nd edition; McGraw-Hill Book Co., Inc. p. 295, 1956.
G. Herdau "Small particle statistics" 2nd edition; 1960; Butterworths; pp. 10 and 11.

*Primary Examiner*—Wayne Langel
*Assistant Examiner*—Stuart L. Hendrickson
*Attorney, Agent, or Firm*—Spencer, Frank & Schneider

[57] ABSTRACT

Process for the manufacture of sodium bicarbonate particles having an ovoid or spherical shape, the process preparing an aqueous solution of sodium bicarbonate, which is supersaturated; circulating the aqueous solution supersaturated in sodium bicarbonate through a bed of crystals in order to cause the bed to be a mobile bed in which the crystals are in continuous motion, and to cause crystallization of the sodium bicarbonate particles and at least partial desupersaturation of the aqueous solution supersaturated in sodium bicarbonate to provide a mother liquor and, withdrawing the sodium bicarbonate particles from the bed.

8 Claims, 5 Drawing Sheets

PROCESS FOR THE CRYSTALLIZATION OF SODIUM BICARBONATE

BACKGROUND OF THE INVENTION

1. Field of the invention

The invention relates to sodium bicarbonate having a specific morphology and to a process for obtaining it.

There are various known processes for obtaining sodium bicarbonate.

A first process, generally termed the ammonia process and commonly used in industry, consists in treating an ammoniacal brine with a gas containing carbon dioxide (TE-PANG HOU-"Manufacture of soda"-2nd edition-American Chemical Society Monograph Series-1969-Hafner Publishing Company-pages 132 to 157).

Another process consists in mixing a saturated aqueous solution of sodium chloride with a nitrogenous organic base insoluble in water (generally an amine) and in treating the resulting mixture with a gas containing carbon dioxide (Pat. Nos. FR-A-2,545,079 and FR-A-2,551,428-SOLVAY & Cie).

To produce sodium bicarbonate of high purity, intended in particular for foodstuffs, an aqueous solution of sodium carbonate is subjected to the action of a gas containing carbon dioxide (SHREVE-"The Chemical Process Industries"-2nd edition-1956-McGraw-Hill Book Company, Inc.-page295).

In these known processes the treatment with the gas containing carbon dioxide produces an aqueous suspension of crystals of sodium bicarbonate. These processes accordingly involve a filtration of the suspension in order to extract the sodium bicarbonate crystals therefrom and a drying of these crystals. These two operations are prolonged and costly and moreover involve heavy investments. The sodium bicarbonate obtained after drying is generally in the form of a fine powder, the particles of which are of irregular shape and size and frequently have a wide particle size distribution.

SUMMARY OF THE INVENTION

The invention relates to sodium bicarbonate of new morphology, which differs from the known sodium bicarbonate in that it is formed of regular particles of larger size.

The invention accordingly relates to sodium bicarbonate which is in the form of ovoid or spherical particles.

Within the framework of the invention, the ovoid particles are particles which have an essentially curved surface free from sharp edges. They generally have a rotation profile which can vary from a lens to an ideal sphere.

According to a specific embodiment, the sodium bicarbonate according to the invention is in the form of ovoid particles having a mean axial ratio of at least 0.5 and preferably greater than 0.7, the mean axial ratio being defined by the relationship:

$$\frac{\sum_{i=1}^{i=n} a_i b_i}{n}$$

where $a_i$ and $b_i$ respectively denote the smallest and the largest axial dimension of a particle, n denotes the number of particles in a representative sample of particles of sodium bicarbonate.

According to another embodiment, which is particularly advantageous, the sodium bicarbonate according to the invention is in the form of particles having a mean diameter of at least 0.25 mm and preferably greater than 0.50 mm, the mean diameter being defined by the relationship:

$$\frac{\sum n_i d_i}{\sum n_i}$$

where $n_i$ denotes the proportion by weight of particles in a sample of particles which have a mean diameter of $d_i$ (G. HERDAN-"Small particle statistics"-2nd edition-1960-Butterworths-pages 10 and 11).

The optimum mean diameter of the particles forming the sodium bicarbonate according to the invention depends on the use for which it is intended. Sodium bicarbonate according to the invention which is very suitable in the majority of applications has a mean particle diameter of between 0.50 and 3 mm and a mean axial ratio of between 0.75 and 0.95. Approximately spherical particles are preferred.

In a preferred embodiment of the sodium bicarbonate according to the invention, the ovoid or spherical particles are monolithic.

Monolithic particle is understood to denote a particle formed from a non-agglomerated unit block of sodium bicarbonate. According to the invention, the monolithic particles are advantageously crystalline. Each particle is preferably a polycrystal.

The sodium bicarbonate according to the invention generally has a high hardness and a high resistance to shocks and to abrasion. Its handling and storage are easy and the risks of emanation of dusts are reduced or even eliminated. Moreover, it has the characteristic of having a moderate rate of dissolution in water.

The sodium bicarbonate according to the invention finds diverse applications, in particular in pharmacy, for human or animal foodstuffs, for the treatment of waste water or acid water and for the production of sodium carbonate.

The invention also relates to a process for the production of sodium bicarbonate, according to which a supersaturated aqueous solution of sodium bicarbonate is circulated through a mobile bed of crystals.

In the process according to the invention, the crystals of the bed serve as seeds for the crystallization of sodium bicarbonate by de-supersaturation of the supersaturated solution. Although it is possible to use crystals of an inorganic material other than sodium bicarbonate, it is preferred, according to the invention, to use a bed of crystals of sodium bicarbonate. The latter can be obtained by any known adequate technique, for example one of the techniques of the prior art described further above.

According to a preferred embodiment of the process according to the invention, some of the sodium bicarbonate crystallized during the process is ground and the ground sodium bicarbonate is recycled into the mobile bed. In fact, it has been observed that the quality of the sodium bicarbonate produced by the process according to the invention is improved (in particular the morphology of the grains is more regular) when the seeds serving to seed the crystallization of the sodium bicarbonate in the bed comprise particles obtained by grinding grains of sodium bicarbonate produced by means of the process according to the invention.

The mobile bed is by definition a bed in which the particles are kept in continuous motion during the passage of the solution of sodium bicarbonate. It can be used in any appropriate crystallizing equipment.

According to a preferred embodiment of the process according to the invention, the mobile bed is a fluidized bed according to the generally accepted definition (GIVAUDON, MASSOT and BENSIMON-"Précis de génie chimique"-Volume 1-1960-Berger-Levrault, Nancy-pages 353 to 370). To this end, the technique described and claimed in French Patent Application 88.10402 (SOLVAY & Cie) is advantageously used, which technique consists in passing the supersaturated solution through a distributor arranged under the bed and designed to distribute the supersaturated solution in fine vertical streams, the distributor being kept at an appropriate temperature to prevent sodium bicarbonate crystallizing spontaneously at its surface. A suitable apparatus for carrying out this embodiment of the process according to the invention comprises a vertical cylindrical tank and a vertical tube which is arranged axially in the tank and has its outlet in the immediate vicinity of the bottom of the latter; the vertical annular chamber which is thus delimited between the axial tube and the cylindrical wall of the tank is divided into two by the distributor of the fluidized bed. When using this equipment, the bed of crystals is used in the annular chamber, above the distributor, and the supersaturated solution is introduced into the axial tube in such a way that it penetrates radially into the annular chamber, close to the bottom of the latter, passes through the distributor and fluidizes the bed of crystals.

The optimum degree of supersaturation of the supersaturated solution depends on various parameters, in particular its temperature and the possible presence of solid or dissolved impurities. In practice, all other things being equal, it is desirable to produce a maximum degree of supersaturation; however this must be limited in order to prevent accidental crystallizations on the walls of the crystallization installation, above the bed of crystals, or anarchic growth of the crystals of the bed, which is prejudicial to their morphology and to their mechanical resistance.

The temperature of the supersaturated solution is not critical. However, it has been observed in practice that the rate of growth of the crystals of the bed is higher the higher the temperature of the solution. However, it is expedient that the temperature of the solution remains below its boiling point at the pressure existing in the crystallization installation. For example, aqueous solutions of sodium bicarbonate having a degree of supersaturation of between 0.5 and 15 g/kg can advantageously be used at a temperature of between 50° and 115° C. when the pressure in the crystallization installation is normal atmospheric pressure. The degree of supersaturation expresses the mass of sodium bicarbonate, per kg of solution, which exceeds the mass corresponding to saturation of the solution.

The means used to obtain the supersaturated aqueous solution of sodium bicarbonate are not critical.

According to a preferred embodiment of the invention, in order to obtain the supersaturated solution, an aqueous solution of sodium bicarbonate (preferably saturated) is first mixed with an aqueous solution of a sodium salt which is more soluble in water than sodium bicarbonate and the said salt is converted to sodium bicarbonate in the resulting mixture. In this embodiment of the process according to the invention, the operation conditions must be controlled to prevent precipitation of bicarbonate during the conversion of the said sodium salt to sodium bicarbonate. These conditions are easily achieved by an appropriate selection of the sodium salt and the relative amounts by weight of the aqueous solutions which are mixed, or of their respective concentrations. The sodium salt can advantageously be sodium chloride or sodium carbonate.

In a first variant of the embodiment of the invention which has just been described, in order to produce the supersaturated aqueous solution of sodium bicarbonate a saturated aqueous solution of sodium bicarbonate is mixed with an ammoniacal brine and the resulting mixture is treated with a gas containing carbon dioxide, adjusting the relative amounts of the solutions and of the gas in order to prevent precipitation of sodium bicarbonate.

In a second variant of the said embodiment, a saturated aqueous solution of sodium bicarbonate is mixed with an aqueous solution of sodium carbonate and the resulting mixture is treated with a gas containing carbon dioxide under conditions which are controlled in order to prevent precipitation of sodium bicarbonate.

In a third variant, a saturated aqueous solution of sodium bicarbonate, an aqueous solution of sodium chloride and an organic liquid insoluble in water containing d nitrogenous organic base insoluble in water are mixed, the resulting mixture is treated with a gas containing carbon dioxide, adjusting the concentrations or the respective amounts of the aqueous solution, the organic liquid and the gas in order to obtain, in the resulting reaction mixture, a supersaturated aqueous solution of sodium bicarbonate, without precipitation, and the said reaction mixture is subjected to decanting in order separately to recover the supersaturated aqueous solution of sodium bicarbonate and an organic phase containing the hydrochloride of the nitrogenous organic base.

In this variant of the process according to the invention, the nitrogenous organic base is, by definition, any nitrogenous organic reactant which is insoluble in water and which has a sufficiently basic character to react with hydrogen chloride to form the hydrochloride of the base. Examples of nitrogenous organic bases which can be used in this variant of the invention are waterinsoluble imines and their derivatives, water-insoluble quaternary ammonium salts and water-insoluble amines and amine derivatives. Primary, secondary or tertiary amines can be used without discrimination. Particularly advantageously primary amines, and very particularly primary alkylamines containing from 12 to 24 carbon atoms, and preferably from 12 to 14 carbon atoms, in the molecule are used.

The organic liquid can consist of the nitrogenous organic base as such, when this is liquid under the conditions under which the process is carried out. Alternatively, it can be a solution of the nitrogenous organic base in an organic solvent insoluble in water. Examples of organic solvents which can be used within the framework of the invention are xylene, butylbenzenes, methylethylbenzenes and very particularly white spirit and the commercially available solvents known by the tradenames ISOPAR (Esso), which is a mixture of isoparaffins, SOLVESSO (Esso), which is a mixture of aromatic compounds, SHELLSOL AB (Shell), which is a mixture of aromatic compounds, and SHELLSOL K, which is a mixture of aliphatic compounds.

The expression "insoluble in water" is understood to signify that the solubility of the nitrogenous organic base and, where appropriate, of the solvent in water is not greater than 2.5% by weight of solution, and preferably 1%.

The organic liquid can optionally contain the hydrochloride of the nitrogenous organic base. Generally, however, it is expedient that the ratio of the weight of hydrochloride of the nitrogenous organic base in the organic liquid to the total weight of the mixture of nitrogenous organic base and hydrochloride does not exceed 0.25, ratios below 0.20 being recommended and those below 0.15 being preferred. In the text which follows this ratio is termed "proportion of hydrochloride in the organic liquid".

BRIEF DESCRIPTION OF THE DRAWING

Particular features and details of the invention will emerge from the following description of the appended drawings.

In these figures, identical reference numbers denote identical elements.

DETAILED DESCRIPTION OF THE PREFERRED EMBODIMENTS

Figure 1:
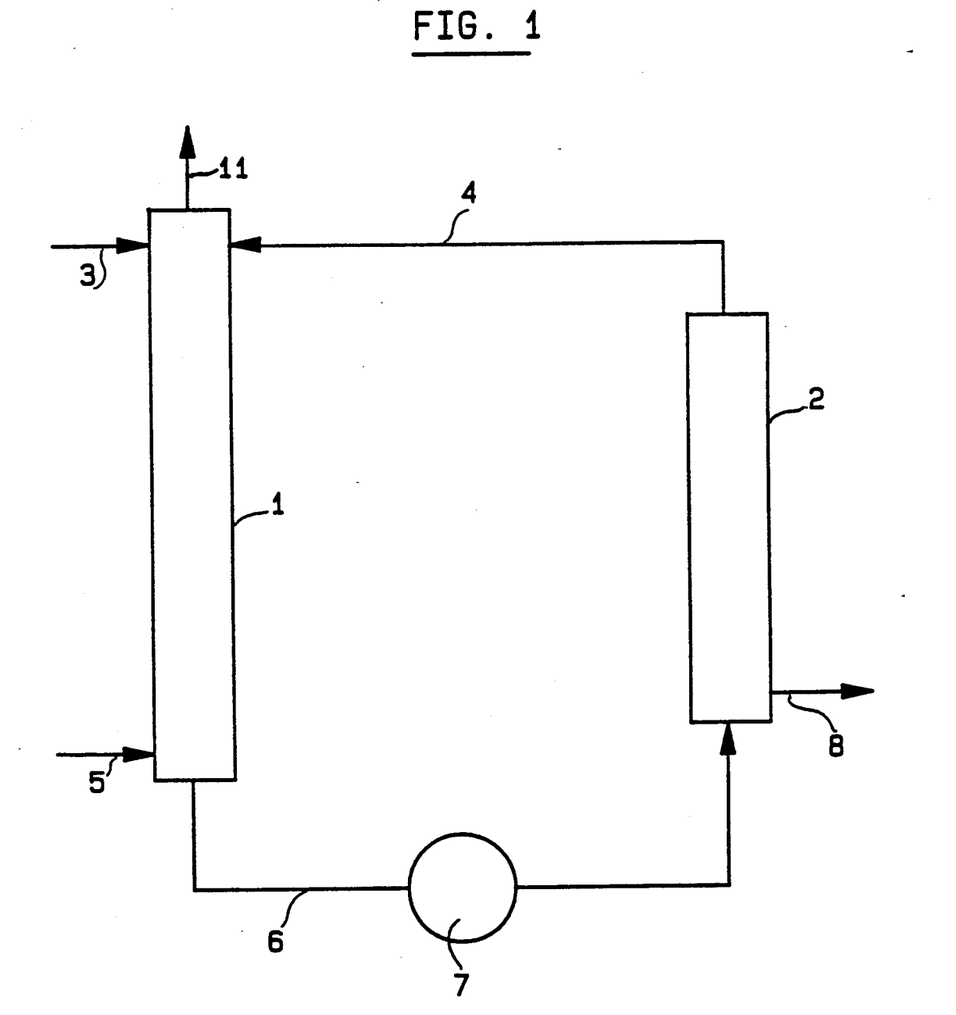
FIG. 1 shows the general diagram of an installation using a first specific embodiment of the process according to the invention.

The installation shown diagrammatically in FIG. 1 comprises a reaction chamber 1 and a crystallization chamber 2.

The reaction chamber 1 is fed continuously and simultaneously with an aqueous solution saturated in sodium carbonate 3, an aqueous solution saturated (or slightly supersaturated) in sodium bicarbonate 4 and a gas 5 containing carbon dioxide. The gas 5 is, for example, gas recovered from a lime kiln, containing at least 60% by weight of carbon dioxide.

The flow rate of the gas 5 is adjusted to a value sufficient to ensure that all of the sodium carbonate introduced via solution 3 into the chamber 1 will be converted in this chamber into sodium bicarbonate. The respective flow rates of solutions 3 and 4 and of the gas are, moreover, adjusted in order to produce, in the chamber 1, an aqueous solution supersaturated in sodium bicarbonate, purposely preventing precipitation of sodium bicarbonate.

The reaction mixture 6 withdrawn from the reaction chamber 1 is accordingly an aqueous solution supersaturated in sodium bicarbonate. It is transferred as such, via a pump 7, into the crystallization chamber 2. The excess gas 11 which has not reacted is also withdrawn from the chamber 1.

In the crystallization chamber 2, the supersaturated solution 6 passes vertically, from bottom to top, through a bed of crystals of sodium bicarbonate of which the mean diameter of the particles ranges between 0.25 and 1 mm approximately. The dimensions of the bed of crystals and the upward speed of the supersaturated solution 6 are adjusted so as to fluidize all of the bed, while preventing the finer particles being entrained by the solution out of the bed. The solution 6 is accordingly progressively de-supersaturated as it passes through the bed, the crystals of which grow in consequence. The coarse size fractions occupying -the bottom of the crystallization chamber are withdrawn periodically or continuously by a withdrawal pipe 8. The height of the bed of crystals is adjusted so that the mother liquor of the crystallization, collected in the upper part of the chamber 2, is an aqueous solution saturated or slightly supersaturated in sodium bicarbonate. It is fed into the reaction chamber 1, where it constitutes the abovementioned solution 4.

Figure 2:
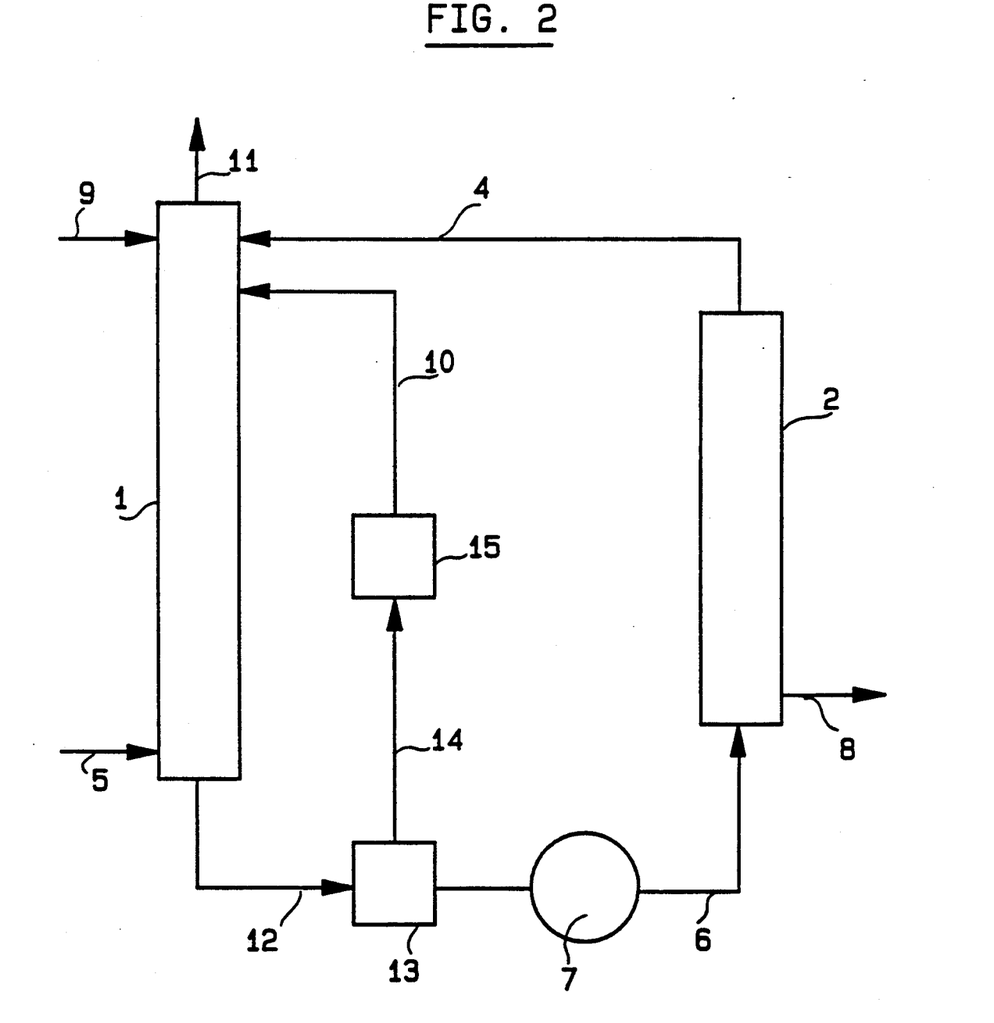
FIG. 2 shows the general diagram of an installation using a second embodiment of the process according to the invention.

In the installation shown in FIG. 2, the reaction chamber 1 is fed simultaneously with a saturated aqueous solution of sodium chloride 9, an aqueous solution saturated (or slightly supersaturated) in sodium bicarbonate 4, a gas 5 containing carbon dioxide and an organic liquid 10 comprising a primary amine insoluble in the aqueous solutions of sodium bicarbonate. The organic liquid 10 can be, for example, a 50% by weight solution in xylene of the primary alkylamine known under the tradename PRIMENE JMT (Rohm & Haas) which contains between 18 and 24 carbon atoms in its molecule. Alternatively, the organic liquid can be a liquid primary alkylamine containing less than 18 carbon atoms in its molecule, used as such, not dissolved in a solvent, for example the amine known under the tradename PRIMENE 81R (Rohm & Haas), the molecule of which contains between 12 and 14 carbon atoms.

The respective flow rates of the aqueous solution 9, the organic liquid 10 and the gas 5 are adjusted in order to convert at least some of the sodium chloride in solution 9 to sodium bicarbonate. The respective flow rates of the aqueous solutions 4 and 9, the organic liquid 10 and the gas 5 are, moreover, adjusted in order to obtain, in the chamber 1, an aqueous solution supersaturated in sodium bicarbonate, explicitly preventing precipitation of sodium bicarbonate.

The reaction mixture 12 withdrawn from the reaction chamber 1 accordingly consists of a supersaturated aqueous solution of sodium bicarbonate and an organic phase comprising amine hydrochloride. The reaction mixture 12 is transferred to a settling chamber 13, where the organic phase of amine hydrochloride 14 and the supersaturated aqueous solution of sodium bicarbonate 6 are separated, by gravity or by centrifuging.

The organic phase 14 is treated in a manner known per se in an apparatus 15 in order to regenerate the amine 10, which is recycled into the reaction chamber 1.

The supersaturated aqueous solution of sodium bicarbonate 6 is fed, via the pump 7, into the crystallization chamber 2, where it is treated in the manner described further above with reference to FIG. 1.

In the installations shown diagrammatically in FIGS. 1 and 2, the reaction chamber 1 can advantageously be an absorption column of the stack type, well known in the art (JOHN, H. PERRY-"Chemical Engineers' Handbook"-4th edition-1963 McGraw-Hill book company-pages 18.27 to 18.53).

The crystallization chamber 2 must be designed to permit the use of a stable mobile bed of crystals. To this end, the crystallization apparatus shown in FIG. 3 can advantageously be used. This apparatus conforms to the apparatus described in French Patent Application 35, 88.10402 (SOLVAY & Cie). It comprises a vertical cylindrical tank 16 in which a vertical tube 17 is arranged axially. The tank 16 is closed by a cover 19, and the vertical tube 17, which moreover has its outlet in the vicinity of the bottom of the tank 16, passes through the said cover 19. A perforated, horizontal, annular partition 22 divides the tank into an upper annular chamber 24 and a lower chamber 25. The upper chamber 24 constitutes the crystallization chamber and contains the bed of crystals 20. The vertical tube 17 serves to admit the supersaturated solution of sodium bicarbonate 6 into the chamber 25; a pipe 21, which opens into the upper part of the chamber 24, serves to remove the mother liquor 4 from the crystallization and a pipe 8 serves for withdrawing crystals.

Figure 3:
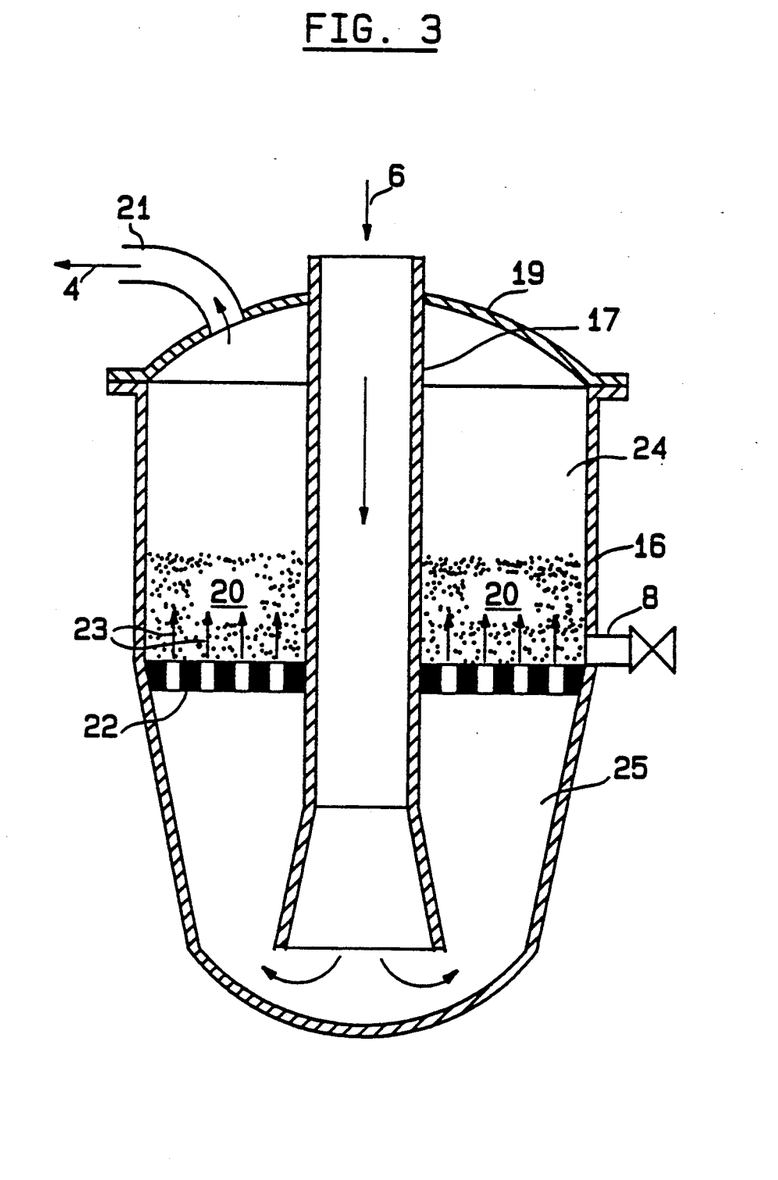
FIG. 3 shows, in vertical axial section, a crystallization equipment containing a fluidized bed, which can be used in the installations of FIGS. 1 and 2.

While the apparatus of FIG. 3 is in operation, the supersaturated aqueous solution of sodium bicarbonate 6 descends vertically in the tube 17, penetrates radially into the lower chamber 25 of the tank 16 and passes successively through the partition 22 and the bed of crystals 20. The function of the partition 22 is to distribute the supersaturated solution 6 in small vertical streams 23 in order to fluidize the bed of crystals 20. The crystals of the bed are accordingly distributed in layers or strata depending on their particle size. The coarse size fractions progress towards the bottom of the bed, from where they are removed periodically or continuously by the withdrawal pipe 8. The de-supersaturated solution leaving the bed is removed by the pipe 21.

The following examples serve to illustrate the invention.

These examples relate to laboratory tests which were carried out in an installation combining a supersaturation chamber for the production of a supersaturated solution of sodium bicarbonate and a chamber for the crystallization of sodium bicarbonate, operating on the principle of a mobile bed of crystals. A cylindrical column fitted with a plurality of horizontal perforated plates, at a regular spacing from one another, was used for the supersaturation chamber. The crystallization chamber consisted of a cylindrical column extended at the base by a conical zone for withdrawing crystals of sodium bicarbonate.

EXAMPLE 1

In this example, the supersaturation chamber was fed with:

an aqueous solution of sodium carbonate containing 250 g of sodium carbonate per kg and calcium in an amount of 180 mg per kg of crystallized sodium bicarbonate—flow rate=10 l/hour;

an aqueous solution saturated in sodium bicarbonate, made up of mother liquor from the crystallization of sodium bicarbonate—flow rate=450 l/hour;

a gas containing 40% by weight of carbon dioxide—flow rate=2 m$^3$/hour.

An aqueous solution supersaturated in sodium bicarbonate was withdrawn at the base of the supersaturation chamber and introduced at the base of the crystallization chamber. At the same time, particles of sodium bicarbonate were introduced into the latter at a rate of about 70 g/hour, these particles being intended to serve as seeds for the seeding of the crystallization of sodium bicarbonate.

The temperature was kept at 60° C. in the supersaturation and crystallization chambers.

Figure 4:
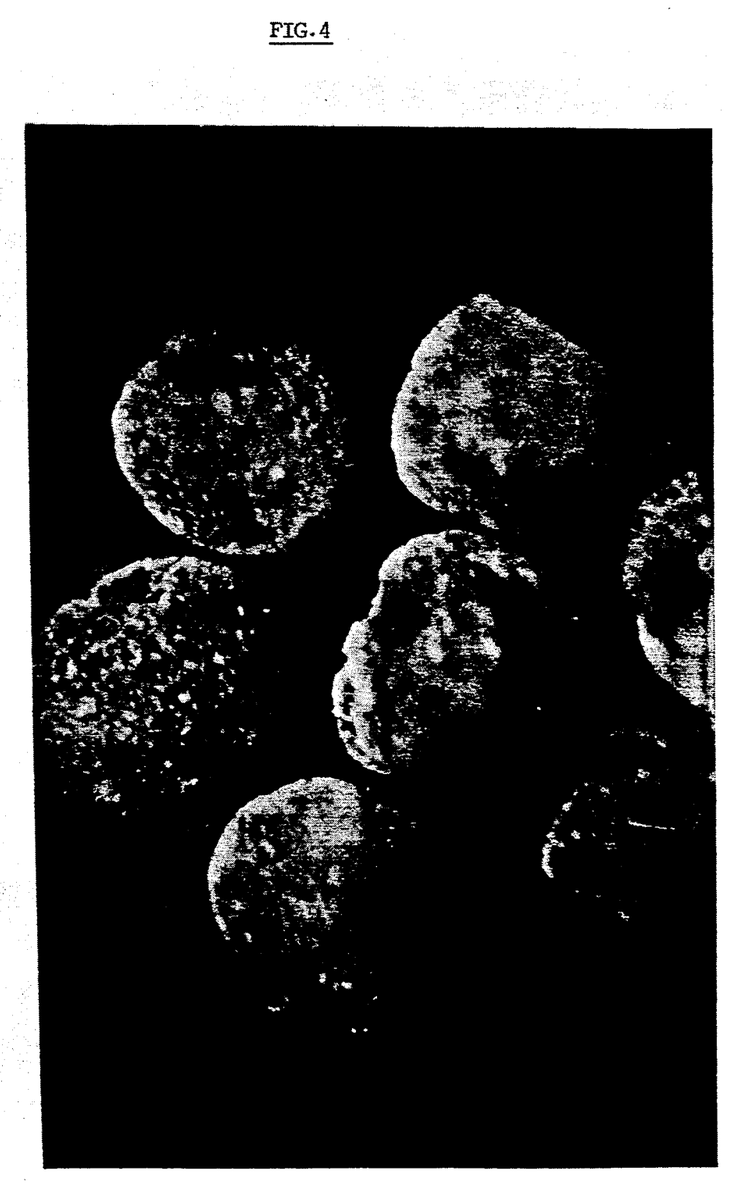
FIGS. 4 and 5 are photographs, enlarged 40 x, of grains of sodium bicarbonate obtained by means of the process according to the invention.

FIG. 4 shows the photograph of grains of sodium bicarbonate collected at the base of the crystallization chamber. These grains have a shape varying from a sphere to an ellipsoid, with no roughness and no sharp edges; they have a mean diameter of 920 microns.

EXAMPLE 2

The test of example 1 was repeated under the following conditions:

composition of the aqueous solution of sodium carbonate:

Na$_2$CO$_3$=250 g/kg of solution

Ca=55 mg/kg of sodium bicarbonate produced;

flow rate of the sodium carbonate solution: 8 l/h;

flow rate of the saturated solution of sodium bicarbonate (mother liquor): 450 l/h;

flow rate of the gas: 2.6 m$^3$/h;

seeding in the crystallization chamber: sodium bicarbonate particles of a mean diameter of 520 microns obtained by grinding grains of sodium bicarbonate withdrawn at the base of the crystallization chamber;

operation temperature: 70° C.

Figure 5:
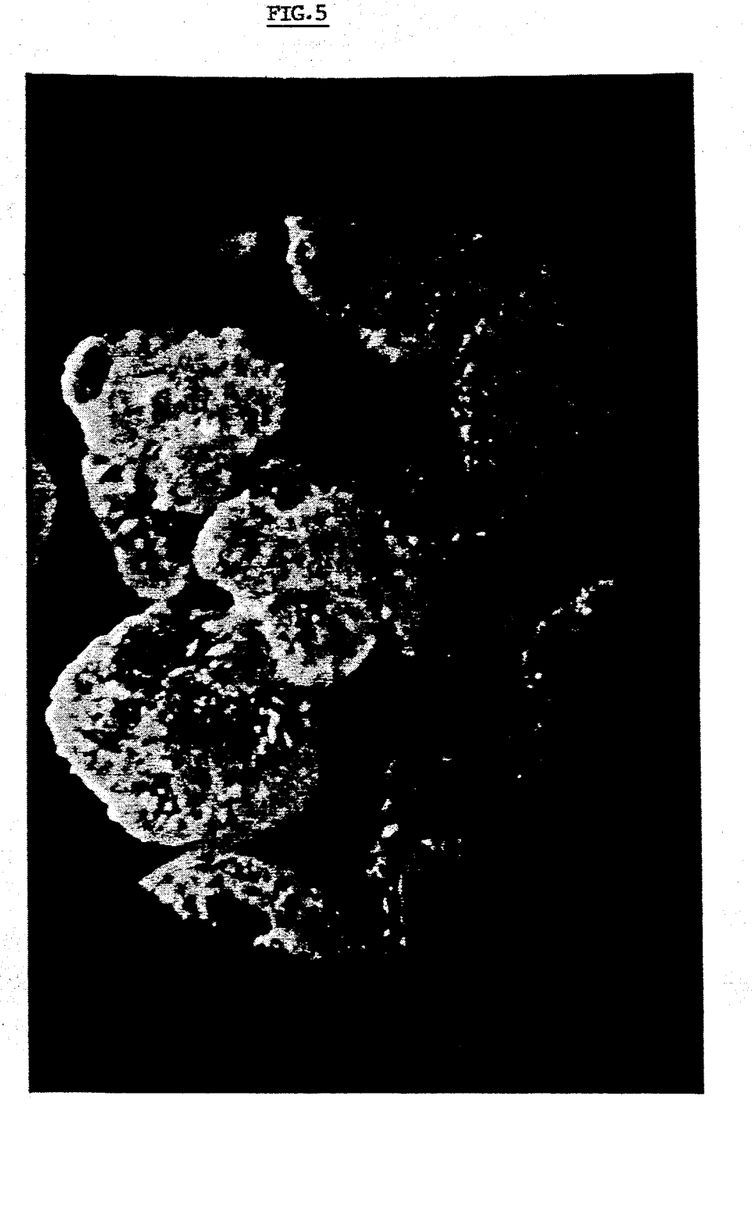

The sodium bicarbonate withdrawn at the base of the crystallization chamber is in the form of regular grains, with no roughness and no rough edges, having a shape varying from a sphere to an ellipsoid and a mean diameter of 900 microns. FIG. 5 shows the photograph of grains collected in the course of the test.

What is claimed is:

1. Process for the manufacture of sodium bicarbonate particles having one of an ovoid shape and a spherical shape, the process comprising:
    a. preparing an aqueous solution of sodium bicarbonate, which is supersaturated;
    b. circulating the aqueous solution supersaturated in sodium bicarbonate through a bed of crystals in order to cause the bed to be a mobile bed in which the crystals are in continuous motion and to cause crystallization of the sodium bicarbonate particles and at least partial desupersaturation of the aqueous solution supersaturated in sodium bicarbonate to provide a mother liquor and,
    c. withdrawing the sodium bicarbonate particles from the bed.

2. The process according to claim 1, further comprising circulating the aqueous solution of sodium bicarbonate upwardly through the mobile bed of crystals under conditions effective to fluidize the bed.

3. The process according to claim 1, wherein the crystals of the mobile bed are crystals of sodium bicarbonate.

4. The process according to claim 3, wherein the mobile bed is comprised of crystals of sodium bicarbonate obtained by grinding a fraction of sodium bicarbonate particles obtained by the process.

5. The process according to claim 1, wherein the aqueous solution supersaturated in sodium bicarbonate prepared in step a is obtained by mixing a saturated aqueous solution of sodium bicarbonate with an aqueous solution of a sodium salt more soluble in water than sodium bicarbonate and converting the sodium salt of the mixture to sodium bicarbonate.

6. The process according to claim 5, wherein the saturated aqueous solution of sodium bicarbonate is the mother liquor from the process.

7. The process according to claim 5, wherein the sodium salt is sodium carbonate which is converted to sodium bicarbonate by treating the mixture with a gas containing carbon dioxide.

8. The process according to claim 5, wherein the aqueous solution supersatured in sodium bicarbonate prepared in step a is obtained by mixing a saturated aqueous solution of sodium bicarbonate, an aqueous solution of sodium chloride, and a nitrogenous organic base insoluble in the aqueous solutions of sodium bicarbonate to provide an organic phase and an aqueous phase, treating the mixture with a gas containing carbon dioxide, and separating the organic phase containing a hydrochloride of the nitrogenous organic base from the aqueous phase comprising the supersaturated aqueous solution of sodium bicarbonate.

* * * * *